Sept. 3, 1929.   P. H. JAMES ET AL   1,727,318
MEANS FOR CUTTING DESIGNS ON GLASS
Filed March 19, 1928   2 Sheets-Sheet 1

INVENTORS,
Parker H. James, and
Harry C. Woodsmall,
By Minturn & Minturn,
Attorneys.

Sept. 3, 1929.   P. H. JAMES ET AL   1,727,318
MEANS FOR CUTTING DESIGNS ON GLASS
Filed March 19, 1928    2 Sheets-Sheet 2

INVENTORS,
Parker H. James,
and Harry C. Woodsmall,
By Minturn & Minturn,
Attorneys.

Patented Sept. 3, 1929.

1,727,318

UNITED STATES PATENT OFFICE.

PARKER H. JAMES AND HARRY C. WOODSMALL, OF INDIANAPOLIS, INDIANA, ASSIGNORS TO RIBBON-MITER MACHINE COMPANY, OF INDIANAPOLIS, INDIANA, A CORPORATION OF INDIANA.

MEANS FOR CUTTING DESIGNS ON GLASS.

Application filed March 19, 1928. Serial No. 262,840.

This invention relates to means for cutting designs or straight lines on sheet glass and has for its primary objects the cutting of perfectly straight lines of uniform width spaced accurately as desired, and the provision of means whereby the operator may at all times observe just how the glass is being cut without having to remove or disturb the glass in relation to the cutting means.

While the invention is perfectly operatable on plate glass, it is of great advantage in working on sheet glass which does not have its faces perfectly plane but is full of waves or varying depressions. To cut the design on the glass, a grinding wheel is employed and the glass is passed over the wheel. If the glass were carried over the wheel at a fixed distance from the center of the wheel, the design would not be cut at a uniform depth into the glass by reason of the waves or irregularities in the glass. By our invention the glass may be made to follow the wheel in a guided relation to give a uniform depth of cut regardless of the variations in glass surface.

Figure 1:
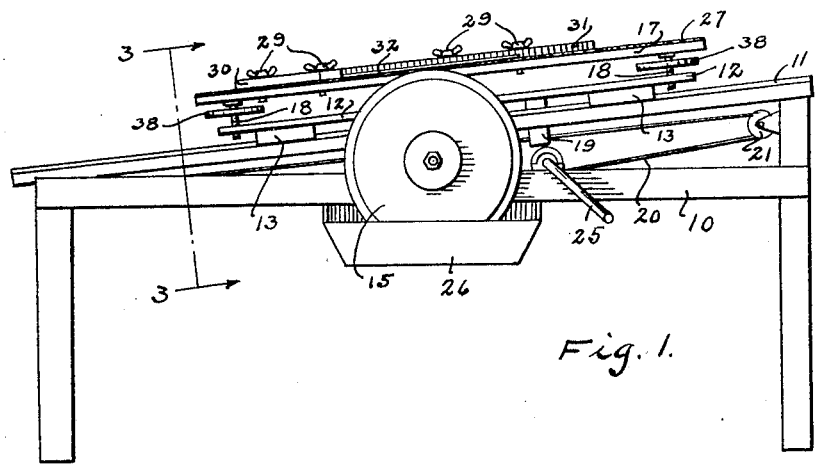
Figure 2:
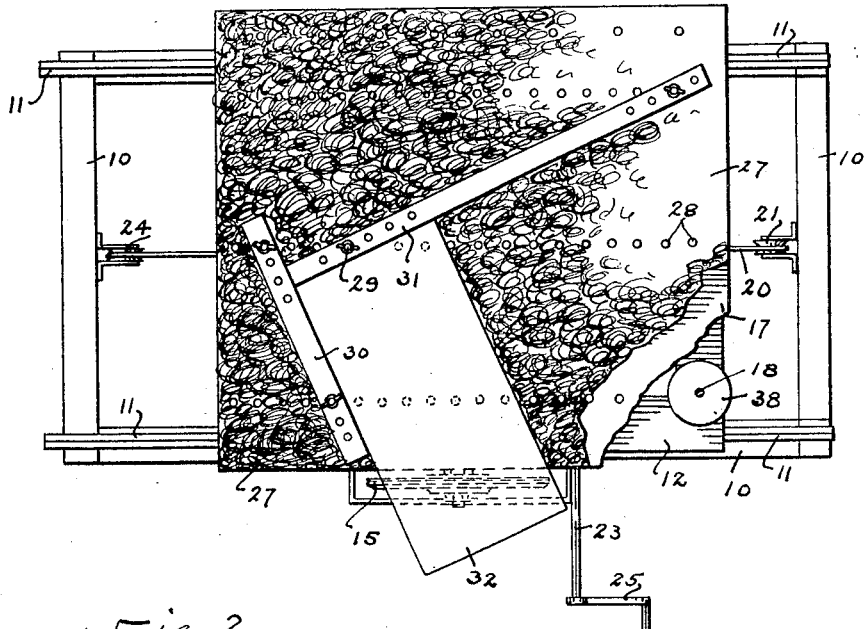
Figure 3:
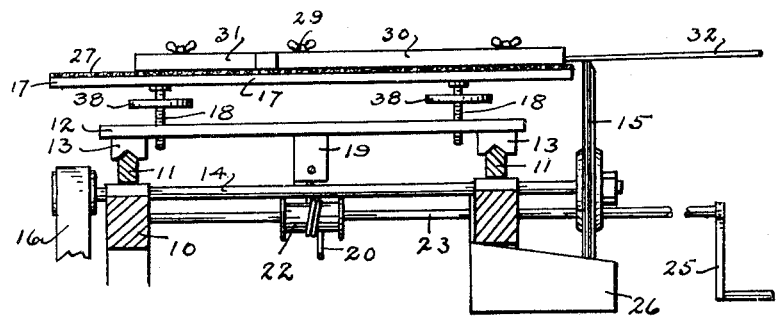
Figure 4:
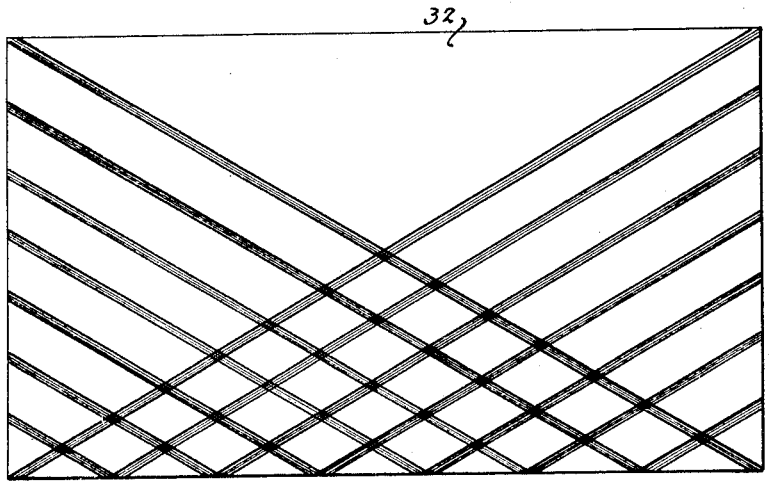
Figure 5:
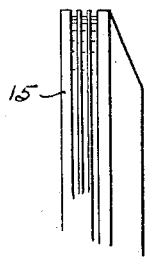

One particular form of the invention is now described in reference to the accompanying drawings, in which:

Fig. 1 is a side elevation of table embodying the invention;

Fig. 2, a fragmentary top plan view of the table;

Fig. 3, a transverse section on the line 3—3 in Fig. 1;

Fig. 4, a plan view of a piece of glass showing a design partially cut thereon by means of the invention; and Fig. 5, an enlarged detail of the cutting edge of the grinding wheel employed to cut the design as shown in Fig. 4.

Like characters of reference indicate like parts throughout the several views in the drawings.

On a suitable base 10 is mounted a pair of V-guides 11 spaced apart to slidingly carry thereon the table frame 12 by means of the frame shoes 13 which fit over the guides 11. The guides 11 are elevated at one end, Fig. 1.

Across the base 10 is carried a shaft 14 on the outer end of which is fixed a grinding wheel 15 of comparatively narrow width, and the shaft 14 is revolved at the desired speed by any means such as by the belt 16, Fig. 3.

A table 17 is carried above the table frame 12 by means of a plurality of posts 18, each pivotally contacting the under side of the table 17, screw-threadedly entering the frame 12 by their lower ends, and carrying a hand wheel 38 to permit quick rotation of the posts so that the table 17 may be raised or lowered as desired as well as tilted to vary its plane with the plane of the wheel 15.

A block 19 is depended from the under side of the frame 12 and an endless cable 20 is secured to the block, passed around a pulley 21 at one end of the base 10 to a drum 22 carried on the transverse shaft 23, wrapped a few times around the drum 22, thence to the other end of the base 10 around the pulley 24 and back to the block 19. The shaft 23 extends out from the base 10 ahead of the wheel 15 and carries a crank 25 on its outer end. By turning the crank 25, the table 17 may be caused to travel along the guides 11.

The table 17 is so made that when traveling past the wheel 15, sufficient clearance is afforded to prevent the wheel striking the table as well as to prevent the liquid in the trough 26 from being splattered onto the table as the wheel revolves. The top of the table 17 is covered with a resilient felt 27, and a plurality of screw-threaded holes 28 are provided in the table 17 to receive retaining thumb screws 29 therein which are employed to locate and retain the stops 30 and 31, which by reason of the location and number of holes 28 may be secured about the table to position a piece of glass 32 thereon at any desired angle of inclination to the table edge.

Supposing that such a pattern as indicated in Fig. 4 is desired to be cut on the glass 32, the glass is positioned on the table top on the felt 27 angularly with the table edge by properly locating and securing the stops 30 and 31 so that the glass may be held thereagainst at the required angle. The table 17 is lowered so that its top is slightly below the extreme top of the wheel 15, the table top being adjusted to be normal to the plane of the wheel 15. The cutting edge of the wheel 15 is here formed, Fig. 5, to cut two outer bands with two narrow bands therebetween, to produce a "ribbon" line as in Fig. 4.

The operator stands with his left side to the base 10 facing the wheel 15, places his left hand on the glass 32 and turns the crank 25 by his right hand. In that position, the operator carries the glass 32 away from him and over the wheel 15 where he can watch closely through the glass exactly how the glass is being cut.

He can then advance the glass over the wheel variably as may be required by suitable turning of the crank 25. The stops 30 and 31 maintain the glass 32 in a fixed relation laterally from the wheel, but permit the glass 32 to be moved vertically. As the table top is slightly below the level of the top of the wheel 15, the glass 32 presses by its own weight onto the wheel 15, and where the glass is harder or depressed, the operator may press down on the glass sufficiently to maintain the uniform width and depth of the cut, the resilience of the felt 27 permitting such movement of the glass and lifting the glass when the extra pressure is removed, the cut, all the time, being made uniformly straight across the glass.

While we have here shown our invention in one particular form, it is obvious that many structural changes may be made without departing from the spirit of the invention, and we, therefore, do not desire to be limited to the precise structure as shown and described, nor any more than may be necessitated by the following claims.

We claim:

1. In a device for cutting designs on glass, a grinding wheel, a table supporting the glass movable in relation to the wheel, means for making major adjustments of the table relative to the periphery of the wheel, and secondary means permitting minor adjustments of the glass relative to the table and wheel, when passing over the wheel without disturbing said major adjustments, whereby the bottom of the cut in the glass produced by said wheel may be maintained in parallel relation to the surface of the glass.

2. In a device for cutting designs on glass, a grinding wheel, a table supporting the glass movable in relation to the wheel, means for making major adjustments of the table relative to the periphery of the wheel, and secondary means permitting minor adjustments of the glass relative to the table and wheel, when passing over the wheel without disturbing said major adjustments, whereby the bottom of the cut in the glass produced by said wheel may be maintained in parallel relation to the surface of the glass, said secondary means comprising felt carried on the table surface, said felt being elastically compressible whereby the glass may be forcibly pressed down against the resistance of the felt and the glass is automatically elevated upon removal of the pressure to permit said wheel to make a cut of uniform depth across an undulating surface of the glass, without having to change said major adjustment.

In testimony whereof they affix their signatures.

PARKER H. JAMES.
HARRY C. WOODSMALL.